(12) United States Patent
Heikkilä

(10) Patent No.: US 7,583,723 B2
(45) Date of Patent: *Sep. 1, 2009

(54) METHOD AND APPARATUS PROVIDING AN ADVANCED MIMO RECEIVER THAT INCLUDES A SIGNAL-PLUS-RESIDUAL INTERFERENCE (SPRI) DETECTOR

(75) Inventor: Markku J Heikkilä, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/080,983

(22) Filed: Apr. 7, 2008

(65) Prior Publication Data

US 2008/0212722 A1 Sep. 4, 2008

Related U.S. Application Data

(63) Continuation of application No. 10/659,412, filed on Sep. 10, 2003, now Pat. No. 7,356,073.

(51) Int. Cl.
*H04B 1/707* (2006.01)
*H04B 7/02* (2006.01)
*H04B 1/10* (2006.01)

(52) U.S. Cl. .................. 375/148; 375/267; 375/350

(58) Field of Classification Search ......... 375/142–145, 375/150, 152, 260, 267, 347, 350, 148
See application file for complete search history.

(56) References Cited

U.S. PATENT DOCUMENTS

| | | | |
|---|---|---|---|
| 6,785,341 B2 | 8/2004 | Walton et al. | 375/267 |
| 7,010,016 B2 | 3/2006 | Margulis et al. | 375/147 |
| 7,218,665 B2 | 5/2007 | McElwain | 375/143 |
| 7,356,073 B2 * | 4/2008 | Heikkila | 375/148 |
| 2005/0053172 A1 | 3/2005 | Heikkila | 375/333 |
| 2005/0118953 A1 * | 6/2005 | Tynderfeldt | 455/63.1 |
| 2006/0291581 A1 | 12/2006 | Onggosanusi et al. | 375/267 |

OTHER PUBLICATIONS

Bauch, Gerhard and Al-Dhahir, Naofal, "Reduced-Complexity Space-Time Turbo-Equalization for Frequency-Selective MIMO Channels", 2002 IEEE, pp. 819-828.

Holter, Bengt, "On the Capacity of the MIMO Channel", Norwegian University of Science and Technology, 2001, pp. 1-19.

(Continued)

*Primary Examiner*—Don N Vo
(74) *Attorney, Agent, or Firm*—Harrington & Smith, PC (57) ABSTRACT

A method is disclosed to obtain M final symbol decisions for signals received through N receive antennas that were transmitted in M parallel data layers, using a same spreading code from M transmit antennas. The method includes space-time equalizing the N received signals to generate M output signals from which at least inter-symbol interference is substantially removed and inter-layer interference is suppressed; despreading each of the M output signals for generating M soft symbol estimates; and processing the M soft symbol estimates to derive M final symbol decisions that are made in consideration of modeled residual inter-layer interference present in the space-time equalized M output signals. Processing includes operating a signal-plus-residual-interference (SPRI) detector that operates in accordance with a maximum likelihood (ML) technique, while space-time equalizing employs a linear minimum mean-square error (LMMSE) criterion. Transmitting may occur at a base station having the M transmit antennas, and receiving may occur at a mobile station having the N receive antennas.

20 Claims, 5 Drawing Sheets

OTHER PUBLICATIONS

Luo, Hui, Liu, Ruey-Wen, Lin, Xieting and Li, Xin, "The Autocorrelation Matching Method for Distributed MIMO Communications Over Unknown FIR Channels", AT&T Labs, University of Notre Dame and Fudan University.

Swindlehurst, A. Lee and Leus, Geert, "A General Framework for Space-Time Coding in MIMO Wireless Communications Systems", Brigham Young University.

Thomas, Timothy A. and Vook, Frederick W., "Broadband MIMO-OFDM Channel Estimation via Near-Maximum Likelihood Time of Arrival Estimation", Motorola Labs, 2002 IEEE, pp. III-2569 to III-2572.

Chan, Albert M. and Lee, Inkyu, A New Reduced-Complexity Sphere Decoder for Multiple Antenna Systems, MIT and Agere Systems, 2002 IEEE, pp. 460-464.

* cited by examiner

METHOD AND APPARATUS PROVIDING AN ADVANCED MIMO RECEIVER THAT INCLUDES A SIGNAL-PLUS-RESIDUAL INTERFERENCE (SPRI) DETECTOR

CROSS-REFERENCE TO A RELATED APPLICATION

This patent application is a continuation of and allowed U.S. patent application Ser. No. 10/659,412, filed on Sep. 10, 2003, now U.S. Pat. No. 7,356,073.

TECHNICAL FIELD

This invention relates generally to radio frequency (RF) communications using Multiple-Input Multiple-Output (MIMO) channels, and more specifically relates to RF downlink channels between a base station (BS) having multiple transmit (Tx) antennas and a terminal, such as a mobile station (MS) having multiple receive (Rx) antennas.

BACKGROUND

When using MIMO channels, it is possible to transmit different data streams from different Tx antennas. This is generally known as a BLAST transmission. More specifically, in a MIMO system multiple parallel data streams are transmitted from different antennas. These data streams are fully interfering with each other, i.e., they are not separated by means of orthogonal spreading codes. A problem thus arises, as the terminal receiver must distinguish the data streams from one another.

During the use of the BLAST-type of MIMO transmission several sources of interference can exist. A first type of interference is the interference between parallel data streams, also referred to as inter-layer interference. A second type of interference is multiple access (intra-cell) interference, which typically results from multipath propagation. A third type of interference is inter-cell interference.

Conventional MIMO receivers may apply space or space-time equalization to suppress at least the first type of interference (inter-layer interference). However, since the interference suppression is imperfect the applicability of MIMO techniques in practical multipath channels is severely restricted.

As will be described below in further detail, several types of MIMO receiver architectures are currently known. A first type of MIMO receiver includes a space equalizer. However, the space equalizer performs spatial domain filtering only, and does not suppress multiple access interference. A second type of MIMO receiver includes a space-time equalizer. The space-time equalizer represents an improvement over the space equalizer, as it performs both spatial and time domain filtering, and also provides at least partial suppression of inter-layer and multiple access interferences. A third type of MIMO receiver operates by performing ordered successive interference cancellation. This type of MIMO receiver uses equalization and interference cancellation, and detects the data streams (i.e., the layers) in successive order. As each layer is detected it is then cancelled from the input signal. However, this type of MIMO receiver suffers from error propagation, and is furthermore highly complex to implement. A fourth type of MIMO receiver includes a Maximum likelihood (ML) detector, and operates with a despread symbol-level signal to search for a best symbol combination using ML criteria. However, the ML-based MIMO receiver does not suppress multiple access interference or inter-symbol interference due to multipath.

A model for a signal vector consisting of baseband signal samples around time instant i is defined to describe different MIMO receivers. A signal sample vector corresponding to receive antenna n is written as:

$$r_n(i) = \begin{pmatrix} r_n(i-F_1) \\ \vdots \\ r_n(i) \\ \vdots \\ r_n(i+F_2) \end{pmatrix} = \sum_{m=1}^{M} (H_{mn}(i) d_m(i)) + n_n(i), \quad (1)$$

where $d_m(i)$ is an unknown symbol or chip vector from transmit antenna m, $H_{mn}(i)$ is a channel matrix, the columns of which are the time-discrete channel impulse responses (from transmit antenna m to receive antenna n) each affecting its respective symbol or chip in vector $d_m(i)$. Vector $n_n(i)$ is the additive noise-plus-interference vector in receive antenna n (including inter-cell interference). Parameters $F_1$ and $F_2$ define the length of the signal vector. If both are set to 0, the signal consists only of one time instant.

It can be noticed that, due to layered MIMO transmission, M symbol streams are directly overlapping and interfering with each other (interlayer interference). Moreover, in multipath channels, channel matrix $H_{mn}(i)$ is not diagonal, thereby causing symbols from a single transmit antenna to overlap. This overlap is the source of multiple access interference in CDMA based systems that apply orthogonal spreading codes. In TDMA-based systems the non-diagonality of the channel matrix causes inter-symbol interference.

The received signal vector in a receiver with N antennas can be obtained simply as $$r(i) = \begin{pmatrix} r_1(i) \\ r_2(i) \\ \vdots \\ r_N(i) \end{pmatrix}. \quad (2)$$

Figure 1:
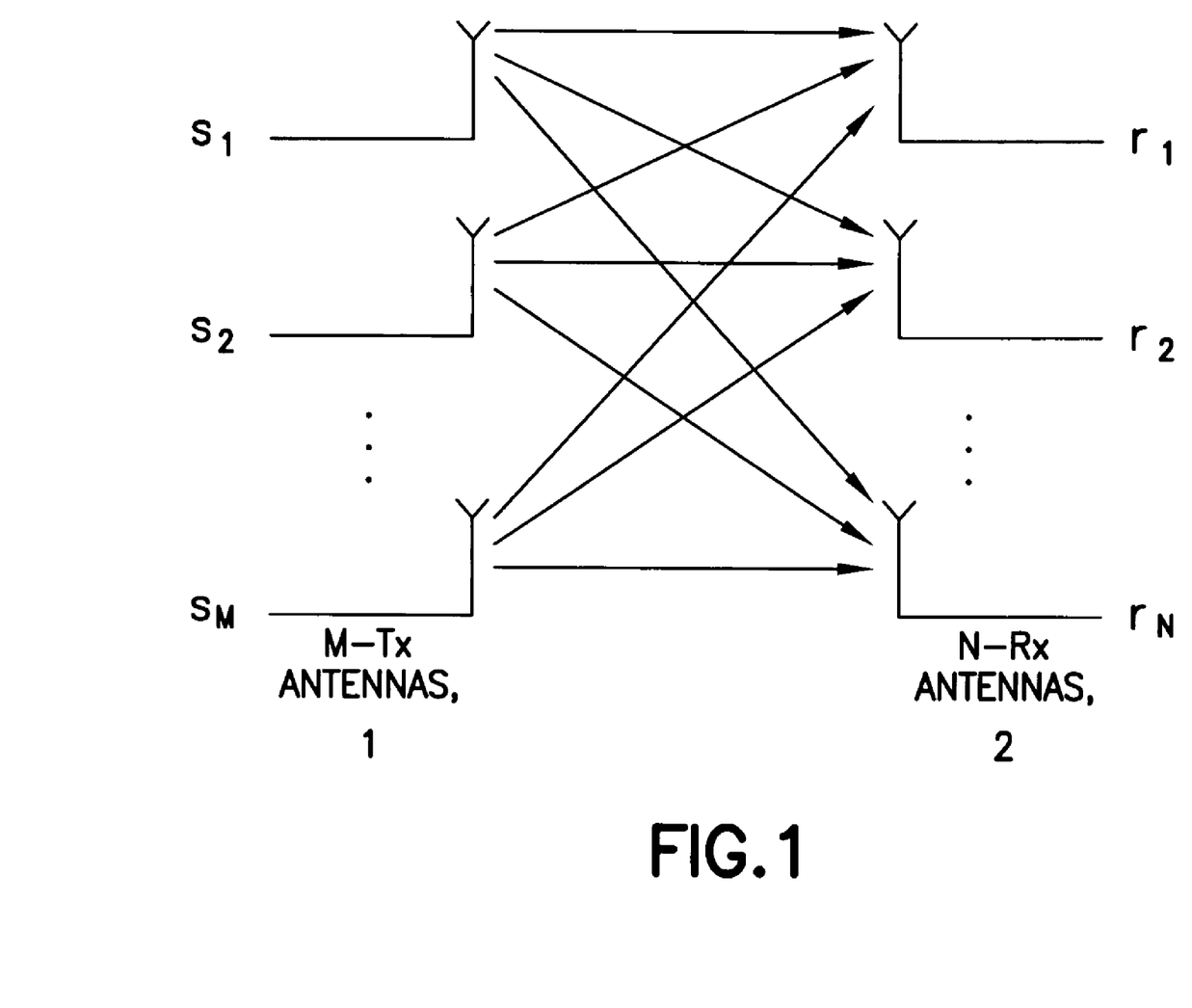
FIG. 1 illustrates a M-by-N MIMO antenna configuration.

FIG. 1 illustrates a conventional M-by-N MIMO antenna configuration with M Tx antennas 1 and N Rx antennas 2. In theory, an N-antenna array can cancel out N-1 interfering signals. Thus, an M-by-N MIMO configuration may, in theory, be implemented if $N \geq M$, since each of the M data streams (layers) are interfered by M-1 data streams. A conventional technique to detect layer m is to combine antenna signals as:

$$\hat{s}_m(i) = (w_{m,1}^* \quad w_{m,2}^* \quad \cdots \quad w_{m,N}^*) \begin{pmatrix} r_1(i) \\ r_2(i) \\ \vdots \\ r_N(i) \end{pmatrix}, \quad (3)$$

where symbol $w_{m,n}$ denotes the complex weighting factor applied to a signal sample from receive antenna n in order to detect transmitted symbol $s_m$ from transmit antenna m. (•)* and ^ denote complex conjugate and estimate, respectively.

In Eq. 3 a possible despreading operation is neglected for simplicity. It should be noted that to detect symbol interval i, only those signals received during that specific time interval need to be used. Thus, this detection method can be referred to as space-equalization, since the data streams are separated by using spatial processing only. However, the space-equalizer can suppress the interfering data streams completely only in noiseless situation. Especially in the presence of multipath channels the space-equalizer cannot separate the data streams properly. This is because all multipath propagated signals function as additional interfering signals, and the interference cancellation capability of an N-antenna array is exceeded.

In this case, space-time equalization can be applied by setting $F_1$ and/or $F_2$ greater than zero:

$$\hat{s}_m(i) = w_m^H \begin{pmatrix} r_1(i-F_1) & \ldots & r_1(i+F_2) & r_2(i-F_1) & \ldots \\ r_2(i+F_2) & \ldots & r_N(i-F_1) & \ldots & r_N(i+F_2) \end{pmatrix}^T \quad (4)$$

$$= w_m^H r(i)$$

where $(\bullet)^H$ denotes conjugate transpose. Vector $w_m$ is comprised of complex weighting factors used for combining signal samples from all N antennas from the specified time interval $[i-F_1, i+F_2]$, as is applied for the detection of the mth data layer.

A goal of space-time equalization is to also remove the inter-symbol interference. The interference suppression is, however, not complete, since linear estimation is always a compromise between noise enhancement and interference suppression. That is, a zero-forcing equalizer would be strongly sub-optimal, since completely removing the interference results in an undesirable noise enhancement. Preferably, the linear minimum mean-square error (LMMSE) criterion is applied.

The space-time equalizer can also be used in combination with the ordered successive interference canceller. In this case the data layer having the strongest received signal is detected first by using an equalizer, and is then cancelled from the input signals. The remaining layers are detected similarly, assuming no residual interference from the already detected and cancelled layer(s). Preferably, pre-decoding interference cancellation is used, as using channel decoded data for interference cancellation requires complex processing operations (involving data buffering, re-encoding, re-spreading and cancellation steps).

MIMO reception can also be based on the ML principle, in which a "best" symbol combination is selected by analyzing through all possible symbol combinations.

In the case of wideband code division, multiple access (WCDMA) reception, there are typically several active users in the downlink signal. The users are separated by orthogonal Walsh spreading codes. A multipath channel, however, distorts the spreading codes and the user orthogonality is impaired. The non-zero cross-correlation between delayed versions of the spreading codes is a source of multiple-access interference, which can be addressed by using a form of channel equalization. However, the downlink signal is also scrambled by using a complex, pseudo-random scrambling sequence that effectively makes the users' spreading codes appear to be random in nature. This also makes the code cross-correlations random making it, in practice, impossible to remove the multiple-access interference from the despread, symbol-level signal. To overcome this problem, the channel equalization is preferably performed by using a chip-level signal, i.e., the signal before despreading and descrambling. When the received signal is despread after chip-level equalization, most of the multiple-access interference can be suppressed without any knowledge of the active interfering code channels.

In the WCDMA downlink that uses MIMO transmission there are thus two sources of interference: (i) interference between parallel data streams (the inter-layer interference referred to above); and (ii) interference between active code channels (the multiple access interference referred to above). Both forms of this interference can be suppressed by using a (chip-level) space-time equalizer, as shown in Eq. (4). The suppression is not, however, perfect, and this can severely limit the applicability of MIMO communication in practical (real-world) multipath environments. Indeed, many of the MIMO results published in the literature assume a single-path channel, in which case the simple space or spatial equalization approach alone would be sufficient.

SUMMARY OF THE PREFERRED EMBODIMENTS

The foregoing and other problems are overcome, and other advantages are realized, in accordance with the presently preferred embodiments of these teachings.

The presently preferred embodiment of this invention combines classical estimation techniques with statistical (e.g., Bayesian) estimation to overcome the shortcomings of the conventional MIMO receiver space-time equalization or maximum-likelihood techniques.

An improved MIMO receiver in accordance with this invention for receiving an M-by-N MIMO channel includes an N-antenna array at the receiver (preferably diversity antennas or correlation antennas), an M-output space-time equalizer (preferably linear minimum mean-square error (LMMSE) criterion based) and M correlators, forming a space-time equalizer. The improved MIMO receiver further includes, in accordance with an aspect of this invention, a signal-plus-residual-interference (SPRI) detector. During operation of the SPRI detector the MIMO receiver generates signal models for both the post-equalization desired signal and for the post-equalization interfering signals. Because of the presence of the space-time equalization, it can be assumed that the channel is a 1-tap channel. If there is a substantial amount of residual inter-layer interference, a corresponding inter-layer signal model may be generated as well. Preferably a maximum-likelihood (ML) based detector is applied to the generated signal model. An aspect the invention is the decoupling the SPRI detector from the space-time equalizer.

Advantages that are realized by the use of the improved MIMO receiver include a substantial performance improvement over conventional MIMO receivers during use with practical, real-world multipath channels. The use of this invention makes MIMO communication possible with multipath channel environments where conventional MIMO receivers can exhibit severe performance problems. Another advantage is that the improved MIMO receiver is not sensitive to equalizer filter mismatch, as the SPRI detector compensates for any residual inter-layer interference. The use of this invention also enables the MIMO receiver to detect M parallel data streams with N<M Rx antennas.

In the preferred embodiment the SPRI detector is implemented using, for example, a sphere-decoder in which the number of searches is significantly reduced as compared to conventional brute-force methods, thereby more than compensating for any additional computational complexity that may be incurred by the use of the SPRI detector.

The improved MIMO receiver and algorithm in accordance with this invention outperforms conventional MIMO receiver techniques, and also makes it possible to use fewer receive antennas than there are parallel data streams (i.e., N<M). This has generally not been considered to be possible to implement in a practical MIMO receiver system.

The improved MIMO receiver is particularly useful in a WCDMA MIMO downlink channel, but is not limited for use to only this one important application.

In one exemplary aspect this invention provides a method to obtain M final symbol decisions for signals received through N receive antennas that were transmitted in M parallel data layers, using a same spreading code from M transmit antennas. The method includes space-time equalizing the N received signals to generate M output signals from which at least inter-symbol interference is substantially removed and inter-layer interference is suppressed; despreading each of the M output signals for generating M soft symbol estimates; and processing the M soft symbol estimates to derive M final symbol decisions that are made in consideration of modeled residual inter-layer interference present in the space-time equalized M output signals. Processing includes operating a signal-plus-residual-interference (SPRI) detector that operates in accordance with a maximum likelihood (ML) technique, while space-time equalizing employs a linear minimum mean-square error (LMMSE) criterion. It is also within the scope of this invention to use a Maximum a posteriori (MAP)-based SPRI detector instead of the ML technique.

Transmitting may occur at a base station having the M transmit antennas, and receiving may occur at a mobile station having the N receive antennas.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 2:
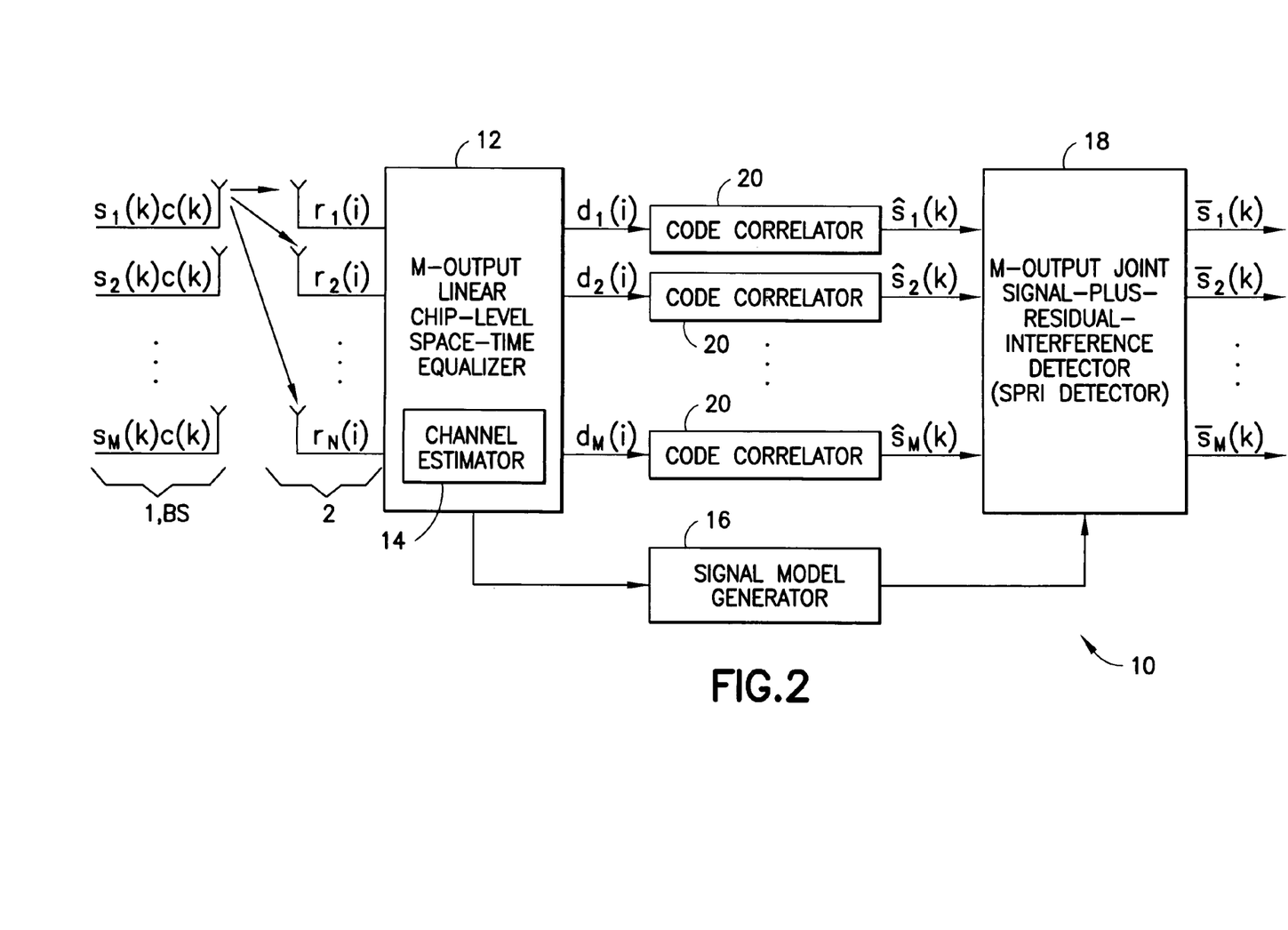
FIG. 2 is a block diagram of a MIMO receiver that includes a SPRI-detector enhanced space-time equalizer for MIMO channels.

FIG. 2 is a block diagram of a MIMO receiver 10 that includes a signal-plus-residual-interference (SPRI) detector 18 for enhancing the operation of a space-time equalizer 12 for MIMO channels (RF circuitry not shown for simplicity). The basic structure of the MIMO receiver 10, for receiving a M-by-N MIMO transmission, can be considered to include the N antenna array 2, the linear space-time equalizer 12 (including a channel estimator 14 providing a channel estimate to a signal model generator 16), as well as a plurality of despreaders or code correlators 20 and the SPRI detector 18 itself. These are considered in turn below. As but one non-limiting example, the MIMO receiver 10 may be a part of a MS, such as a WCDMA cellular telephone that is adapted for voice and/or data operation.

As is shown in FIG. 2, a base station (BS) is assumed to transmit M symbols in parallel using the same spreading code, c(k), from the M antennas 1. The transmitted signal typically also includes other code channels, for example, code channels for speech users and code channels for data users.

The time-discretized channel impulse response vector from antenna m to receive antenna n, during chip interval i, is given by:

$$h_{mn}(i) = (0 \ldots 0 \; h_{mn,1}(i) \; h_{mn,2}(i) \ldots h_{mn,L}(i) \; 0 \ldots 0)^T, \quad (5)$$

where $(\bullet)^T$ denotes transpose. The length of the non-zero part of the impulse response is L samples (zeros have been added at both ends of the vector).

This corresponds to the output for transmit antenna m and receive antenna n of the channel estimator 14. The zeros in the beginning and the end of $h_{mn}$ are needed because, in general, the equalizer vector w is much longer than the channel impulse response. With these zeros, the position of h inside the time window of w can be adjusted (this can affect the equalizer performance).

In MIMO communication, each transmit antenna transmits its own pilot signal and these pilot signals are orthogonal between different transmit antennas. A plurality of conventional channel estimators are assumed to be included in channel estimator 14. For delay estimation it is typically sufficient to estimate the delay using a single receive antenna, and to use the delay estimate for all receive antennas as the delays are substantially the same for all antennas (which may be within a few centimeters of each other).

After the channel between the M Tx antennas 1 and the N Rx antennas 2, the analog-to-digital converted signal samples from the N receive antennas are stacked into a vector:

$$r(i) = \begin{pmatrix} r_1(i) \\ r_2(i) \\ \vdots \\ r_N(i) \end{pmatrix}.$$

The time index i refers to chip-interval i which is to be estimated by the following space-time equalizer 12.

The linear space-time equalizer 12 is preferably based on a minimum mean-square error criterion, and estimates the chip-level signal transmitted from transmit antenna m:

$$\hat{d}_m(i) = w_m^H(i) r(i) \quad (6)$$

Each transmit antenna M may be assumed to require its own space-time equalizer. This is particularly useful in a WCDMA system, but is not limited for use to only this system.

Each of the space-time equalized signals output from the equalizer 12 $(d_1(i), \ldots, d_M(i))$ are despread by an associated code correlator 20. It should be noted that, due to the space-time equalization, the channel can at this point be assumed to be a single-path channel. At this point in the signal reception, it can farther be assumed that at least part of the multiple-access and inter-layer interference is suppressed. The despreading operation performed by code correlators 20 can be mathematically expressed as:

$$\hat{s}_m(k) = c^H(k) \hat{d}_m(k), \quad (7)$$

where vector $d_m(k)$ is obtained by collecting chip estimates (see Eq. (6)) that correspond to the kth symbol interval into a single vector. Eq. (7) can be seen to represent tentative soft estimates for the M symbols transmitted from the M transmit antennas 1.

A description is now made of the Signal-Plus-Residual-Interference (SPRI) detector 18, in accordance with this invention.

The final step in the reception process that is illustrated in FIG. 2 is to determine the signal model for the desired signal and for the residual inter-layer interference in the soft decisions obtained by the use of Eq. (7). The SPRI detector 18 uses the signal model obtained from the signal model generator 16. Eq. (7) can be written as (where the time index k neglected for simplicity):

$$\hat{s}_m = \underbrace{A_{mm}s_m}_{\text{desired signal}} + \underbrace{\sum_{j=1,2,\ldots,M, j\neq m} A_{jm}s_j}_{\text{residual interference from other layers}} + \underbrace{n_m}_{\substack{\text{other} \\ \text{interference} \\ \text{and noise}}}, \quad (8)$$

where $A_{jm}$ is the (residual) amplitude of the symbol from transmit antenna j when the symbol from transmit antenna m was detected by the space-time equalizer 12. Note that if $A_{jm}(j\neq m)$ is non-zero, it is implied that there is residual interference from transmit antenna j. This can be considered to be the case in all practical situations, due to multipath propagation and additive noise.

It should be noted that $A_{jm}$ can be determined using knowledge of the channel impulse responses, as given by Eq. (5), as:

$$A_{jm} = w_m^H \begin{pmatrix} h_{j1} \\ h_{j2} \\ \vdots \\ h_{jM} \end{pmatrix}, \quad j=1,2,\ldots,M. \quad (9)$$

Thus, the signal model generator 16 operates to compute Eq. (9). The SPRI detector 18 then applies a maximum-likelihood (ML) criterion to obtain final symbol decisions:

$$\begin{pmatrix} \bar{s}_1 \\ \bar{s}_2 \\ \vdots \\ \bar{s}_M \end{pmatrix} = \arg\min_{u_1,u_2,\ldots u_M} \left\{ \sum_{m=1}^{M} \left| \hat{s}_m - (A_{1m} \; A_{2m} \; \ldots \; A_{Mm}) \begin{pmatrix} u_1 \\ u_2 \\ \vdots \\ u_M \end{pmatrix} \right|^2 \right\}. \quad (10)$$

Detection of the mth data layer is thus not based only on the mth correlator 20 output, but on the outputs of all of the correlators 20. The SPRI detector 18 also takes into account the inter-layer interference that was not removed by the space-time equalizer 12. The ML search is preferably implemented using, for example, a sphere decoding algorithm so that only a fraction of all symbol combinations are required to be tested (as opposed to using a brute force approach that tests all possible symbol combinations). Reference in this regard can be made to Chan, A. M.; Inkyu Lee: "A new reduced-complexity sphere decoder for multiple antenna systems", IEEE International Conference on Communications, 2002. ICC 2002, Volume: 1, 28, April-2 May 2002, pages: 460-464, who describe one suitable type of sphere decoding algorithm.

It can be noted that those received signal layers for which Eq. (9) indicates only very small amplitude may be excluded from the ML search (e.g., those layers having an amplitude less than about 10 % of the strongest channel amplitude, where 10% amplitude equals 0.1*0.1=0.01=−20 dB power level).

In the embodiment of FIG. 2, an important purpose of the space-time equalizer 12 is to suppress signal components for which the MIMO receiver 10 does not have an exact signal model (e.g., multiple-access interference, inter-cell interference), or which are not desired to be modeled (e.g., inter-path interference, inter-symbol interference and interference between a user's own code channels) in order to reduce the complexity of the SPRI detector 18.

The benefits derived from the use of the improved MIMO receiver 10 of FIG. 2 can be simulated by assuming a WCDMA downlink in a 5-path modified ITU vehicular A channel. Transmission to a desired user is by M-by-N MIMO transmission (vertical-BLAST), and the user is assumed to be allocated one 16-chip spreading code. The total BS power is normalized to $I_{or}=1.0$. The user is allocated a power which results in bit energy $E_b$ after despreading. The presence of some additive noise is assumed, representing inter-cell interference, the power of which, $N_0$, is defined through a so-called geometry factor $G=I_{or}/N_0=1.0/N_0$. G is related to the user's position within the cell and is fixed during the simulation. When $E_b/N_0$ is increased, the user's power allocation in the BS is increased so that power for other users is reduced (total power is however always 1.0). No channel coding was applied during these simulations. The target performance level is about 5% raw bit error rate (BER), depending on channel coding rate.

Figure 3A:
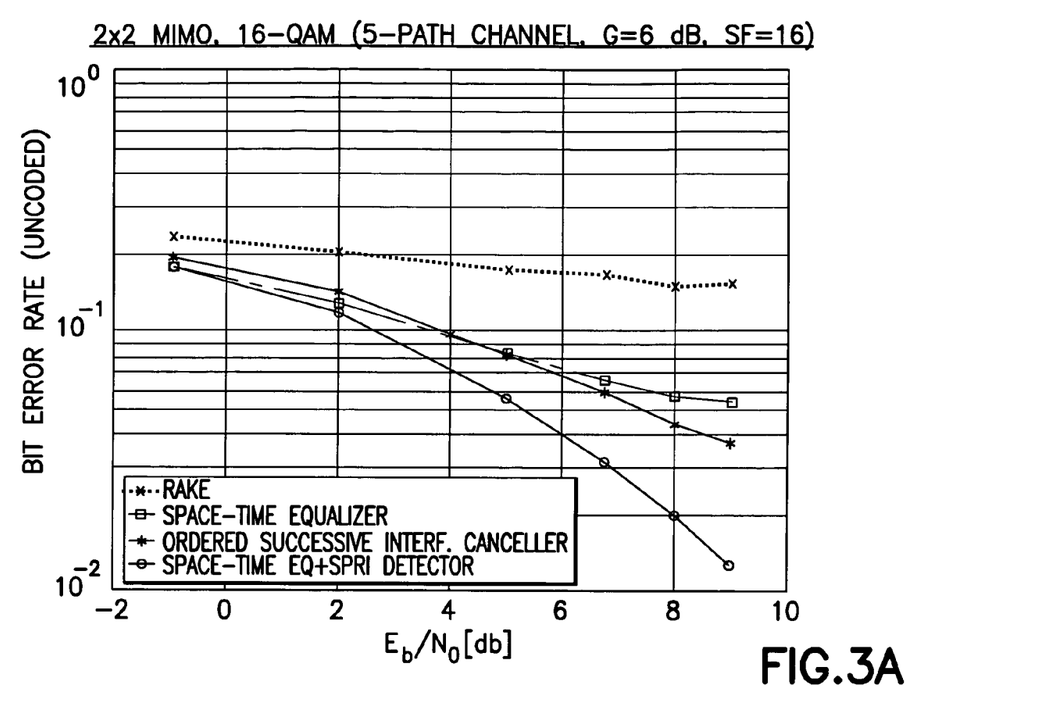
FIG. 3A is a graph for a 2×2 MIMO (16-QAM, 8 bit/s/Hz) case, and shows the improvement in bit error rate (BER) provided by space-time equalizer plus SPRI detector as compared to other (conventional) receiver types (RAKE, space-time equalizer and ordered successive interference canceller)

FIG. 3A shows the simulation results for 2-by-2 MIMO (16-QAM, 8 bit/s/Hz). It can be seen that the improved MIMO receiver 10, that includes the SPRI detector 18, outperforms other MIMO receivers even in the simple 2-by-2 case. It can be noted that the conventional ordered successive interference canceller clearly suffers from error propagation.

Figure 3B:
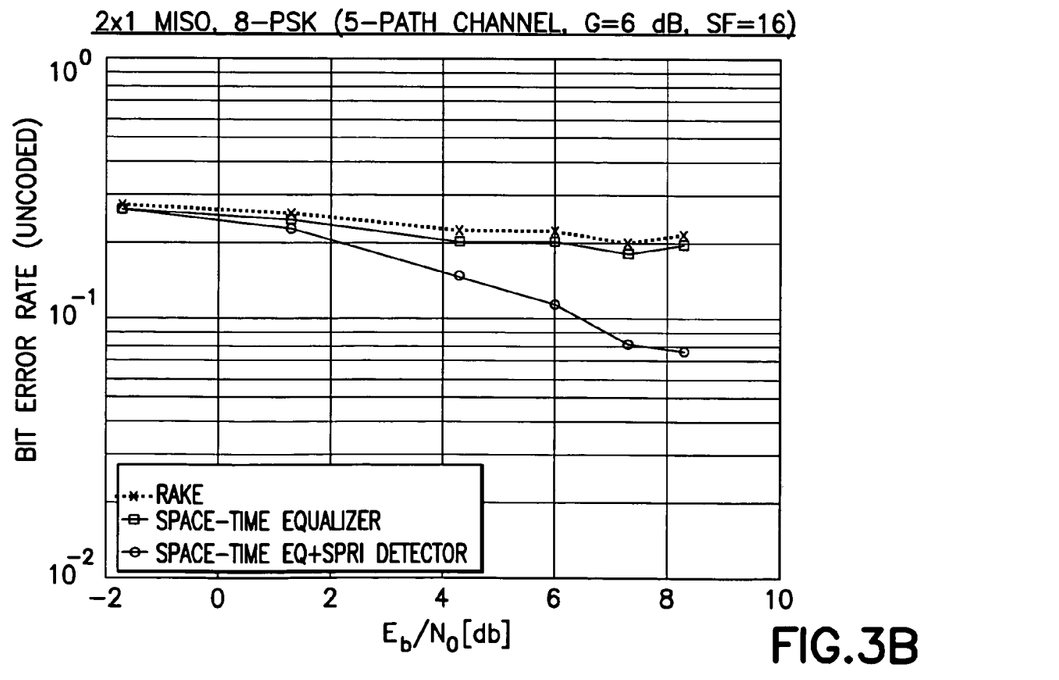
FIG. 3B is a graph for a 2×1 MISO (8-PSK, 6 bit/s/Hz) case, and shows that two parallel streams can be detected using only one receive antenna with the space-time equalizer plus SPRI detector, where BER is compared to the RAKE and space-time equalizer receiver types.

FIG. 3B shows the simulation results for a 2-by-1 Multiple-Input, Single Output (MISO, 8-PSK, 6 bit/s/Hz) case. It is seen that two parallel streams can be detected using only one receive antenna with the improved MIMO receiver 10, that includes the SPRI detector 18, even in Vehicular A channel case.

Figure 3C:
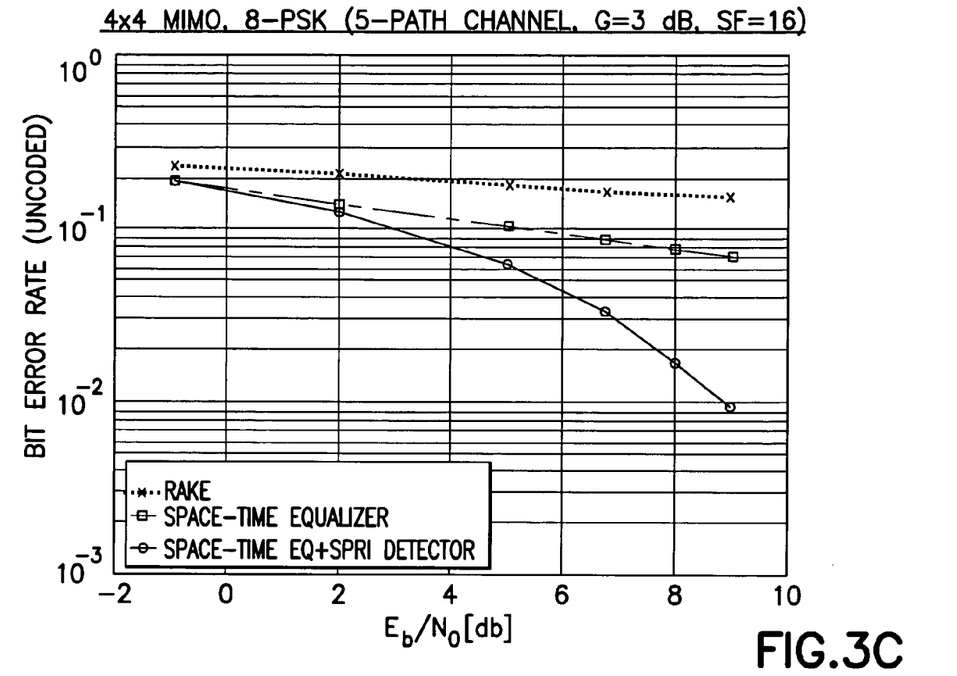
FIG. 3C is a graph for a 4×4 MIMO (8-PSK, 12 bit/s/Hz) case, and contrasts the BER performance of the space-time equalizer plus SPRI detector with the BER performance of the RAKE and space-time equalizer receiver types.

FIG. 3C shows the simulation results for a 4-by-4 MIMO (8-PSK, 12 bit/s/Hz) case. The improved MIMO receiver 10, that includes the SPRI detector 18, can be seen to offer a gain of several decibels in the target BER region, as compared to the conventional RAKE and space-time equalizer approaches. It should be noted that the ordered successive interference canceller was not implemented due to its significantly higher complexity (e.g., four space-time equalizers, each requiring its own signal covariance matrix inversion step, would be needed, in addition to requiring signal regeneration by filtering the re-spread signal with channel impulse responses).

Figure 3D:
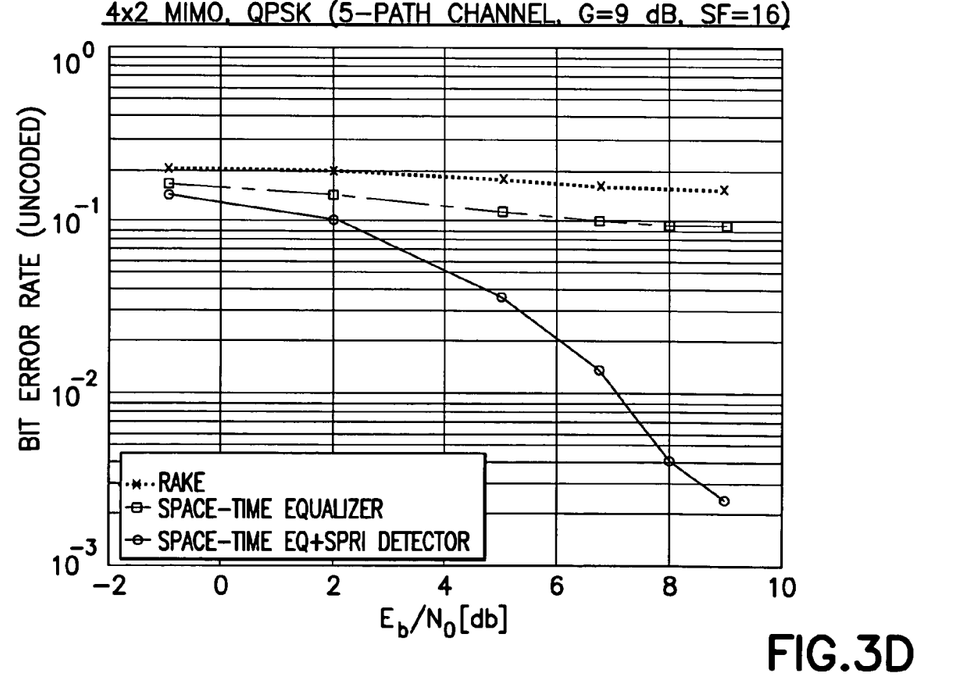
FIG. 3D is a graph for a 4×2 MIMO (QPSK, 8 bit/s/Hz) case showing that four parallel data streams can be detected using only two receive antennas, and contrasts the BER performance of the space-time equalizer plus SPRI detector with the inferior BER performance of the RAKE and space-time equalizer receiver types.

FIG. 3D shows the simulation results for a 4-by-2 MIMO (QPSK, 8 bit/s/Hz) case. It can be seen that SPRI-detector 18 enhanced space-time equalizer 12 can detect four parallel data streams with only two receive antennas. In this case the conventional MIMO receivers (RAKE and space-time equalizer only) do not achieve the target BER region.

The improved MIMO receiver 10 can be used as described above to detect MIMO signals, such as those received from a MIMO WCDMA communications channel, or it may be used in connection with an ordered successive interference canceller (OSIC) to replace a space or a space-time equalizer.

Figure 4:
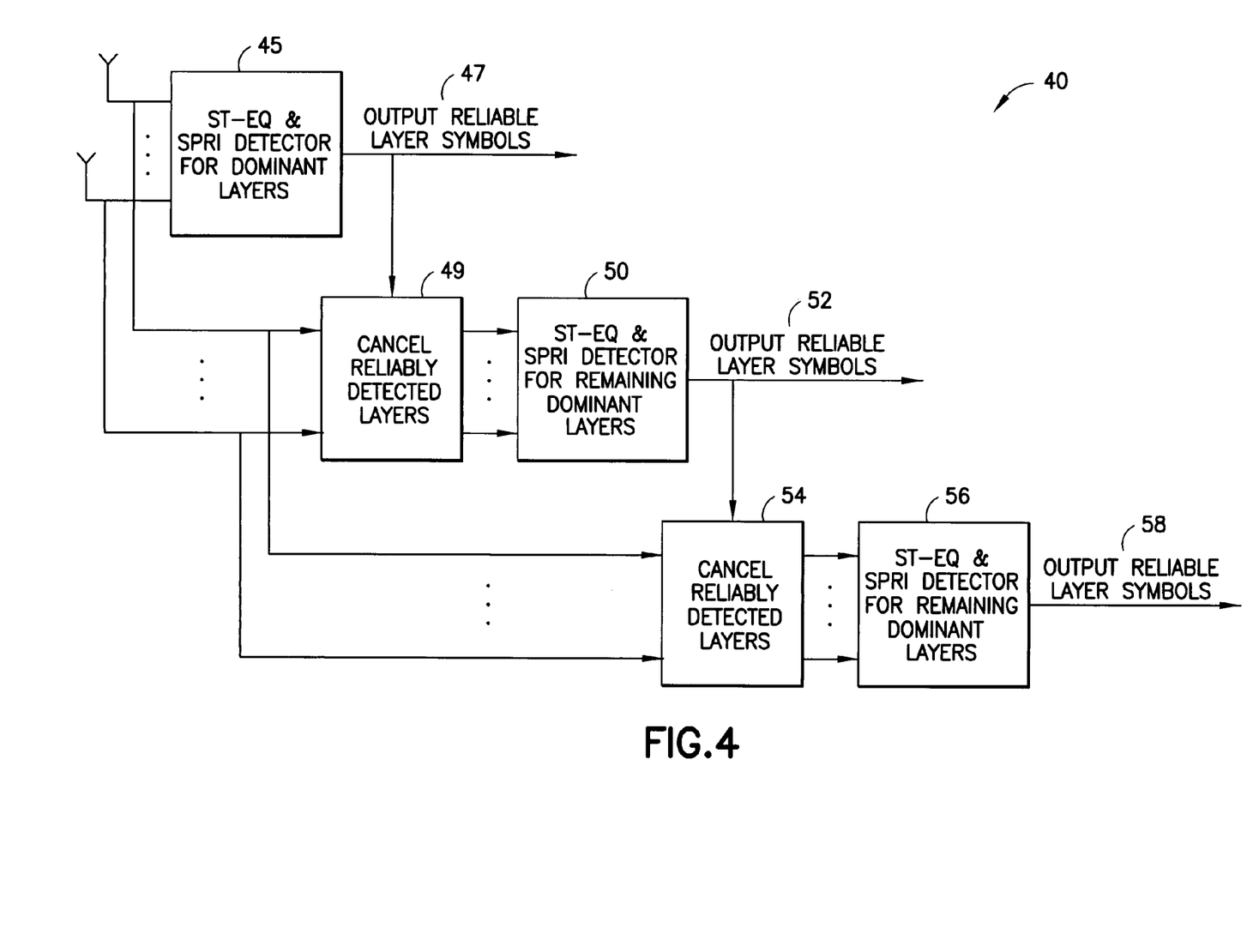
FIG. 4 is a block diagram illustrating the structure of an Ordered Successive Interference Canceller (OSIC) receiver in accordance with an aspect of this invention.

FIG. 4 shows the structure of an OSIC receiver 40 according to the present invention. The first stage detects all dominant layers 45 (i.e. layers with large enough received power) using an equal number of space-time equalizers coupled to a SPRI detector as described earlier. In M-by-N MIMO system, there can be $D_1 \leq M$ dominant layers to be detected. $D_1$ can be smaller than M if some layers are so weak that they do not cause substantial interference to other layers. However, only those layers (symbol estimates) which can be considered reliable enough are output at the first stage 47. The reliability can be estimated e.g. based on the signal-to-noise ratio of each layer. The number of reliable layers is $R_1 \leq D_1$.

The signals of reliable layers are regenerated and cancelled 49 from the received signals. The resulting signals can be considered free of interference from these $R_1$ layers. In the second stage 50, $D_2 \leq M-R_1$ layers out of the total $(M-R_1)$ remaining layers are dominant in the signals and are detected as in the first stage according to the present invention. Out of these detected layers, $R_2 \leq D_2$ layers are considered reliable and the corresponding symbols are output as final symbol decisions for these layers 52. The operation continues with signal regeneration and cancellation 54 and subsequent receiver stages until all layers have been detected.

If $R_n$ is always 1, only a single layer's symbol estimate is output at each stage. This corresponds to pure OSIC operation. If $R_n$ is larger than 1, the operation is a form of groupwise successive interference cancellation (GSIC).

Thus, while this invention has been described above in the context of presently preferred embodiments, those having skill in the art should appreciate that the foregoing description is not to be construed in a limiting sense upon the implementation and practice of this invention, especially in view of the fact that those having skill in the art may derive various modifications to this invention, when guided by the foregoing description. Further, this invention can be embodied in hardware, or in software that controls a digital data processor, such as a digital signal processor (DSP), or in a combination of hardware and software. All such and similar modifications to the invention as disclosed above are considered to fall within the scope of this invention.

What is claimed is:

1. A method, comprising:
    space-time equalizing N received signals to generate M output signals from which at least inter-symbol interference and inter-layer interference are suppressed;
    despreading each of the M output signals for generating M soft symbol estimates; and
    processing the M soft symbol estimates to derive M final symbol decisions that are made in consideration of modeled residual inter-layer interference present in the space-time equalized M output signals, where processing further comprises operating a signal-plus-residual interference (SPRI) detector that operates in accordance with a maximum likelihood (ML) technique.

2. A method as in claim 1, where space-time equalizing employs a linear minimum mean-square error (LMMSE) criterion.

3. A method as in claim 1, where transmitting occurs at a base station having the M transmit antennas, where receiving occurs at a mobile station having the N receive antennas, and where N<M.

4. A system to obtain M final symbol decisions for signals received through N receive antennas that were transmitted in M parallel data layers, using a same spreading code from M transmit antennas, comprising:
    a space-time equalizer configured to operate on the N received signals to generate M output signals from which at least inter-symbol interference and interlayer interference are suppressed;
    a plurality of despreaders configured to despread each of the M output signals to generate M soft symbol estimates; and
    processing apparatus configured to process the M soft symbol estimates to derive M final symbol decisions that are made in consideration of modeled residual inter-layer interference present in the M output signals of said space-time equalizer, where said processing apparatus further comprises a signal-plus-residual-interference (SPRI) detector that operates in accordance with a maximum likelihood (ML) technique.

5. A system as in claim 4, where said space-time equalizer employs a linear minimum mean-square error (LMMSE) criterion.

6. A system as in claim 4, where the M transmit antennas are associated with a base station, where the N receive antennas are associated with a mobile station, and where N<M.

7. A Multiple Input, Multiple Output (MIMO) RF receiver, comprising: apparatus configured to receive M symbols transmitted in M parallel data layers through N receive antennas, using a same spreading code, c(k), from M transmit antennas; a space-time equalizer having N inputs coupled to said N receive antennas and M outputs coupled to individual ones of M code correlators, the space-time equalizer configured to suppress at least inter-symbol interference and inter-layer interference; a signal model generator having an input coupled to a channel estimator and an output for outputting at least a model of residual inter-layer interference; and a signal-plus-residual-interference (SPRI) detector having M inputs coupled to outputs of said M code correlators configured to receive M soft symbol estimates there from, a further input coupled to said output of said signal model generator, and M outputs configured to output M final symbol decisions that are made taking into account the residual inter-layer interference that was not removed by said space-time equalizer.

8. A MIMO RF receiver as in claim 7, where said signal model generator computes:

$$A_{jm} = w_m^H \begin{pmatrix} h_{j1} \\ h_{j2} \\ \vdots \\ h_{jM} \end{pmatrix}, j=1,2,\ldots,M,$$

where $A_{jm}$ is the residual amplitude of the symbol from transmit antenna j when a symbol from transmit antenna m is detected by said space-time equalizer.

9. A MIMO RF receiver as in claim 8, where said SPRI detector uses a maximum-likelihood (ML) criterion to obtain the final symbol decisions as:

$$\begin{pmatrix} \bar{s}_1 \\ \bar{s}_2 \\ \vdots \\ \bar{s}_M \end{pmatrix} = \arg \min_{u_1,u_2,\ldots u_M} \left\{ \sum_{m=1}^{M} \left| \hat{s}_m - (A_{1m}\ A_{2m}\ \ldots\ A_{Mm}) \begin{pmatrix} u_1 \\ u_2 \\ \vdots \\ u_M \end{pmatrix} \right|^2 \right\},$$

where detection of an mth data layer is based on the outputs of all of said M code correlators.

10. A MIMO RF receiver as in claim 7, where said signal model generator generates signal models for both desired signals and for interfering signals appearing at said M outputs of said space-time equalizer.

11. A MIMO RF receiver as in claim 7, where said space-time equalizer operates with a linear minimum mean-square error (LMMSE) criterion.

12. A MIMO RF receiver as in claim 7, where N<M.

13. A received signal-plus-residual-interference (SPRI) detector comprising M inputs configured to be coupled to M sources of soft symbol estimates in which inter-symbol interference and inter-layer interference have been suppressed, a further input configured to be coupled to an output of a signal model generator that models residual inter-layer interference present in an equalized received signal, and M outputs configured to output M final symbol decisions that are made taking into account the residual inter-layer interference.

14. The SPRI detector as in claim 13, where the signal model generator computes:

$$A_{jm} = w_m^H \begin{pmatrix} h_{j1} \\ h_{j2} \\ \vdots \\ h_{jM} \end{pmatrix}, \; j = 1, 2, \ldots, M,$$

where $A_{jm}$ is the residual amplitude of a symbol from transmit antenna j when a symbol from transmit antenna m is detected by a space-time equalizer that generates the equalized received signal, and where said SPRI detector uses a maximum-likelihood (ML) criterion to obtain the final symbol decisions as:

$$\begin{pmatrix} \bar{s}_1 \\ \bar{s}_2 \\ \vdots \\ \bar{s}_M \end{pmatrix} = \arg \min_{u_1, u_2, \ldots u_M} \left\{ \sum_{m=1}^{M} \left| \hat{s}_m - (A_{1m} \; A_{2m} \; \ldots \; A_{Mm}) \begin{pmatrix} u_1 \\ u_2 \\ \vdots \\ u_M \end{pmatrix} \right|^2 \right\},$$

where detection of an mth data layer is based on all said M sources of soft symbol estimates.

15. The SPRI detector as in claim 13, where the received signal is received through N receive antennas from M transmit antennas, where N≦M.

16. A system to obtain M final symbol decisions for signals received through N receive antennas that were transmitted in M parallel data layers, using a same spreading code from M transmit antennas, comprising:

an equalizer configured to operate on the N received signals to generate M output signals from which at least inter-symbol interference and inter-layer interference are suppressed;

a plurality of despreaders arranged to despread each of the M output signals for generating M soft symbol estimates; and processing apparatus configured to process the M soft symbol estimates to derive M final symbol decisions that are made in consideration of modeled residual inter-layer interference present in the M output signals of said equalizer.

17. A system as in claim 16, where said processing apparatus comprises a signal-plus-residual-interference (SPRI) detector.

18. A system as in claim 17, where said SPRI detector operates in accordance with a maximum likelihood (ML) technique.

19. A system as in claim 17, where said SPRI detector operates in accordance with a Maximum a posteriori (MAP) technique.

20. A system as in claim 17, where said system forms a part of an ordered successive interference canceller (OSIC) receiver.

* * * * *